Patented Sept. 3, 1929.

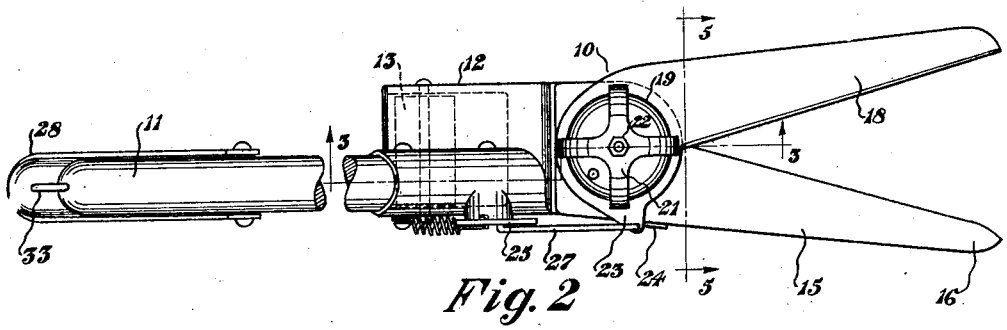
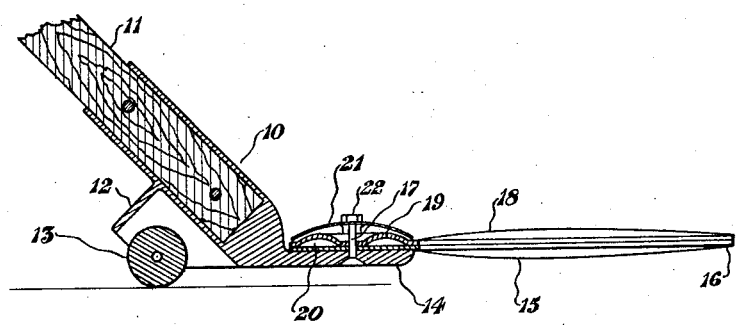
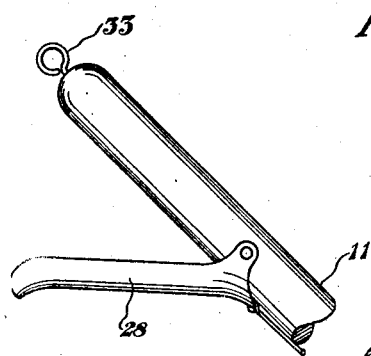
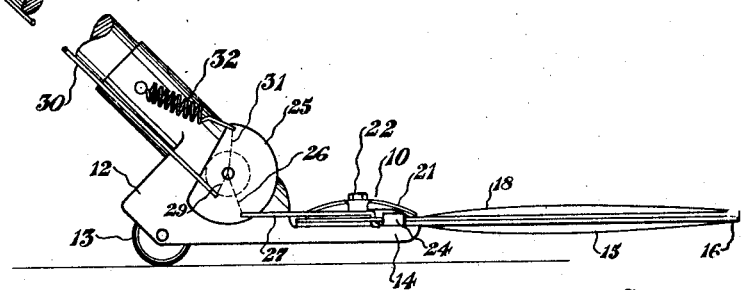
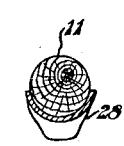
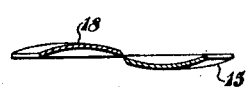

1,727,067

UNITED STATES PATENT OFFICE.

AVERY R. KEEFE, OF CANTON, OHIO.

LAWN TRIMMER.

Application filed August 4, 1927. Serial No. 210,567.

My invention relates to tools for trimming lawns and the like, and each including a long handle with shears at the lower end and shears actuating means at the upper end thereof, so the tool may be operated with one hand while the operator is in a standing position.

The objects of the present improvements are to provide a simplified construction and arrangement for such a lawn trimmer, adapted for easy and economical production, and for convenient operation and economical maintenance.

These and ancillary objects are attained in the lawn trimmer hereinafter set forth in detail, and which may be stated in general terms as including in combination with a long handle, oscillating shears at the lower end of the handle and angular thereto, and an actuating lever for the shears at the upper end of the handle and operatively connected with the shears and adapted for operation by gripping and releasing of the handle and lever by one hand of the operator, a double acting spring controlled bell crank interposed and connected between the actuating lever and the oscillating shears, a roller for the shear blades and the angle between the shear blades and the handle being sufficient so that the blades will slide over the ground when the roller is not in contact therewith due to uneven surfaces, a U-cross section for the actuating lever so that the same will fit snugly about the handle at one extreme position of oscillation of the lever, one of the shear blades being stationary and provided with a curved tip terminating in a relatively sharp abrupt point to enable the blade to be slipped at one side of grass located close to the elevated side of a cement walk and the like, the other blade being pivoted to and oscillatable with respect to the stationary blade and being provided with a broad oscillating bearing preferably formed by a boss pressed in the blade material and adapted to stiffen the same and provide an oil pocket and reduce the surface friction of the bearing, a spider shaped compression spring providing constant pressure between the shear blades, an eye bolt at the upper end of the handle for hanging up the trimmer when not in use, and a connecting rod between the actuating lever and the bell crank and located closely adjacent the handle for preventing interference around shrubbery and the like.

A preferred embodiment of my invention is illustrated in the accompanying drawing forming part hereof, in which—

Figure 1 is a fragmentary elevation view of the improved lawn trimmer;

Fig. 2, a fragmentary plan view thereof;

Fig. 3, a fragmentary sectional view as on line 3—3, Fig. 2;

Fig. 4, a detached fragmentary sectional view with distant parts removed, illustrating the actuating lever fitting snugly about the handle at its upper extreme position of oscillation; and Fig. 5, a sectional view as on line 5—5, Fig. 2, illustrating the preferred dished blades for the trimmer.

Similar numerals refer to similar parts throughout the several views.

The improved lawn trimmer indicated generally at 10, includes a relatively large handle 11, at the lower end of which is mounted a shear carriage 12 provided with a roller 13 for rolling the carriage and attached shears over the lawn to be trimmed.

The carriage 12 includes a shear mounting foot 14 extending at a relatively large angle with the handle, whereby the foot 14 may slide over uneven surfaces of the ground when the roller 13 is not in contact therewith.

A stationary blade 15 is secured upon the foot 14 and terminates with a curved tip 16 having a relatively large sharp abrupt point enabling the blade to be slipped at one side of grass located close to the side faces of cement walks, borders and the like.

A pivoted pin 17 extends upwardly from the foot 14 and provides a pivotal mounting for an oscillating blade 18, which is provided with a broad oscillating bearing formed by an annular boss 19 pressed upwards in the blade material concentric with its pivotal mounting and adapted to stiffen the blade and to provide an oil pocket 20 between the oscillating blade and the stationary blade and to reduce the surface friction between the blades at the bearing.

A spider compression spring 21 is secured on the pin 17 as by means of a nut 22 and provides a constant pressure between the shear blades 15 and 18.

The shear blades are preferably oppositely dished, as illustrated in Fig. 5, to strengthen the same and to enable them to be made of sheet or strip material and to make them substantially self sharpening.

The oscillating blade 18 is provided with a laterally extending arm 23, whose movement away from the handle is limited by a stop 24 on the stationary blade 15.

A bell crank disk 25 is mounted for oscillating on the carriage 12 above the foot 14, providing a crank arm indicated by the dash line 26, which is connected with the arm 23 of the oscillating blade by means of a rod 27 having hooked ends.

At the upper end of the handle, an actuating lever 28 is oscillatably mounted and is preferably provided with a U-cross section for fitting snugly about the handle 11 at its upper limit of oscillation, as illustrated in Fig. 4.

The lever 28 is connected with an actuating crank arm indicated by the dash line 29 on the disk 25, by means of the rod 30, which is located closely adjacent the handle 11 for preventing interference around shrubbery and the like.

The disk 25 also provides a spring crank arm indicated by the dash line 31 extending opposite to the actuating arm, and the spring crank arm is connected by a tension spring 32 with the carriage 12, whereby an oscillation of the disk 25 by means of the connected lever 28 by gripping the lever and handle, impresses a tension load on the spring 32 which returns the disk 25 to its normal position of static equilibrium, thereby causing an opening and closing shearing oscillation of the blade 18 over the stationary blade 15.

The improved lawn trimmer thus described is adapted to be made largely by the use of pressed metal parts and is accordingly very economical to manufacture and the simplified construction provides a light, easily handled lawn trimmer.

An eye 33 is provided at the upper end of the handle for hanging up the lawn trimmer when not in use.

I claim:

1. A lawn trimmer including a relatively long handle, oscillating shears at the lower end of the handle and angular thereto, an actuating lever at the upper end of the handle, a bell crank including three arms mounted for oscillation between the actuating lever and the shears, a link connecting one arm of the bell crank with the shears, a link connecting another arm of the bell crank with the lever, and a spring connecting the other arm of the bell crank with the handle.

2. A lawn trimmer including a relatively long handle, a carriage at the lower end of the handle, a stationary shear blade mounted on the carriage and angular to the handle, an oscillating shear blade pivoted on the carriage for oscillation across the stationary blade, a laterally extending arm on the oscillating blade, an actuating lever at the upper end of the handle, a bell crank including three arms mounted for oscillation between the actuating lever and the shears, a link connecting one arm of the bell crank with the arm of the oscillating blade, a link connecting another arm of the bell crank with the lever, and a spring connecting the other arm of the bell crank with the handle.

3. A lawn trimmer including a relatively long handle, a carriage at the lower end of the handle, a stationary shear blade mounted on the carriage and angular to the handle, an oscillating shear blade pivoted on the carriage for oscillation across the stationary blade, an annular boss on the oscillating blade about the pivotal mounting therefor, a laterally extending arm on the oscillating blade, an actuating lever at the upper end of the handle, a bell crank including three arms mounted for oscillation between the actuating lever and the shears, a link connecting one arm of the bell crank with the arm of the oscillating blade, a link connecting another arm of the bell crank with the lever, and a spring connecting the other arm of the bell crank with the handle.

In testimony that I claim the above, I have hereunto subscribed my name.

AVERY R. KEEFE.